(12) United States Patent
Saito et al.

(10) Patent No.: US 8,734,264 B2
(45) Date of Patent: May 27, 2014

(54) SYSTEM AND METHOD FOR MEASUREMENT AND ANALYSIS OF BEHAVIOR OF GOLF CLUB HEAD IN GOLF SWING

(75) Inventors: Takashi Saito, Kodaira (JP); Koji Takao, Hachioji (JP); Hideo Matsunaga, Hanno (JP); Hirotada Iwade, Tokorozawa (JP)

(73) Assignees: Bridgestone Corporation, Tokyo (JP); Bridgstone Sports Co., Ltd., Tokyo (JP)

( * ) Notice: Subject to any disclaimer, the term of this patent is extended or adjusted under 35 U.S.C. 154(b) by 0 days.

(21) Appl. No.: 13/534,204

(22) Filed: Jun. 27, 2012

(65) Prior Publication Data
US 2013/0005495 A1    Jan. 3, 2013

(30) Foreign Application Priority Data

Jun. 28, 2011    (JP) .................. 2011-143547

(51) Int. Cl.
*A63B 69/36*    (2006.01)

(52) U.S. Cl.
USPC ........... 473/222; 473/219; 473/220; 473/221; 473/223; 473/257; 700/91

(58) Field of Classification Search
USPC ......... 473/219–223, 231, 233, 242, 257, 407, 473/409; 700/91
See application file for complete search history.

(56) References Cited

U.S. PATENT DOCUMENTS

| | | | |
|---|---|---|---|
| 2004/0127304 A1* | 7/2004 | Plank, Jr. | 473/221 |
| 2005/0159231 A1* | 7/2005 | Gobush | 473/131 |
| 2005/0202892 A1* | 9/2005 | Otten et al. | 473/151 |
| 2007/0206837 A1* | 9/2007 | Kirby | 382/107 |
| 2008/0287207 A1* | 11/2008 | Manwaring | 473/199 |
| 2011/0300959 A1* | 12/2011 | Hasegawa et al. | 473/221 |
| 2011/0313552 A1* | 12/2011 | Davenport | 700/91 |
| 2012/0302379 A1* | 11/2012 | Margoles et al. | 473/407 |

FOREIGN PATENT DOCUMENTS

| | | |
|---|---|---|
| JP | 2007-244716 A | 9/2007 |
| JP | 2010-46539 A | 3/2010 |

* cited by examiner

*Primary Examiner* — Lawrence Galka
(74) *Attorney, Agent, or Firm* — Sughrue Mion, PLLC

(57) ABSTRACT

An object of the present invention is to provide a system and method for measurement and analysis of a behavior of a golf club head. Specifically, the system comprises a measurement and analysis device having a marker recognition and positional information acquisition unit for recognizing the at least one marker and acquiring positional information of the recognized at least one marker, a vector calculation unit for calculating a first vector representing a direction of the head and a second vector representing a tangent vector of a trajectory of the head during the golf swing, and a vector angle change acquisition unit for calculating a vector angle between the first vector and the second vector and acquiring a time series change of the calculated vector angle.

3 Claims, 5 Drawing Sheets

SYSTEM AND METHOD FOR MEASUREMENT AND ANALYSIS OF BEHAVIOR OF GOLF CLUB HEAD IN GOLF SWING

BACKGROUND OF THE INVENTION

1. Field of the Invention

The present invention relates to a system and a method for measurement and analysis of a behavior of a golf club head in a golf swing.

2. Description of Related Art

Generally, when a golfer swings a golf club with an intention for hitting (shooting) a golf ball straight forward, it is desirable that a flying direction of the golf ball is relatively straight and not (hardly) curved. Such desirable shot is realized relatively easily in the case where every golfer uses an appropriate golf club. However, as a practical matter, it is not easy for a golfer to select an appropriate golf club that is suitable for oneself at a shop.

A flying direction of a golf ball is affected by an amount of backspin and launch angle in a golf swing. These factors are known to be affected strongly by a behavior of a golf club head when the golf club head (in the following, just called as a head) hits (impacts) a golf ball.

Therefore, as disclosed in JP 201046539 (A), for example, head measurement device capable of acquiring information of movements in up and down direction and movements in right and left direction. The head measurement device of JP 201046539 can acquire information of a head movement in up and down direction with respect to a horizontal line and information of head movement in right and left direction with respect to a horizontal line just before a moment of hitting a golf ball (an impact). Moreover, according to JP 201046539, processes of plotting measurement results on a chart having a vertical and horizontal axis respectively representing either of approaching angle in the right and left direction or in up and down direction and of displaying the acquired information have been suggested.

Moreover, conventionally, a golf club selection support device has been suggested, as described in JP2007244716 (A). The device has a displacement detection device which detects head displacement to measure the speed and the rotation speed of the head of a golf club just before the club strokes a golf ball and an arithmetic processor which obtains the value of the head speed and the value of the head rotation speed/head speed on the basis of the detection data of the displacement detection device and selects the optimum golf club from a plurality of golf clubs having different characteristics in accordance with the values.

SUMMRY OF THE INVENTION

Problems to be solved by the Invention

However, the flying direction of a golf ball is affected not only from the behavior of the head just before the impact but also from the head speed and a face direction during a process of approaching impact. The head measurement device of JP 201046539 (A) is capable of acquiring information of movements in up and down direction and movements in right and left direction. The head measurement device of JP 201046539 (A) cannot acquire information of head rotation during the process of approaching toward the impact. Moreover, the displacement detection device of JP2007244716 (A) for detecting the displacement of the golf club head is used for measuring a golf swing, specifically, for measuring the head speed and the approaching angle. The information of the head speed and the face direction in the process to the impact cannot be obtained by using the device of JP2007244716 (A).

Thus, the object of the present invention is to provide a system and a method for measurement and analysis of a behavior of a golf club head capable of acquiring the information of the head speed and the face direction until the impact, in a golf swing by a golfer.

Means for solving the Problems

In order to achieve the aforementioned purpose, the measurement and analysis system according to the present invention is a measurement and analysis system for measuring and analyzing a head behavior when a golfer hits a golf ball by a golf club; the system comprises:

a golf club used by the golfer and having at least one marker on a head;

at least one camera for imaging a golf swing by using the golf club; and a measurement and analysis device having a marker recognition and positional information acquisition unit for recognizing the at least one marker and acquiring positional information of the recognized at least one marker, a vector calculation unit for calculating a first vector representing the direction of the head and a second vector representing a tangent vector of a trajectory of the head during the golf swing, and a vector angle change acquisition unit for calculating a vector angle between the first vector and the second vector and acquiring a time series change of the calculated vector angle.

Preferably, in the measurement and analysis system according to the present invention, the golf club has at least two markers, and the vector calculation unit calculates the first vector based on the positional information of the at least two markers acquired by the marker recognition and positional information acquisition unit.

In order to achieve the aforementioned purpose, the measurement and analysis method according to the present invention is a measurement and analysis method for measuring and analyzing a head behavior when a golfer hits a golf ball by a golf club; the method includes steps of:

recognizing the at least one marker and acquiring positional information of the recognized at least one marker for images of a golf swing by using the golf club having at least one marker on a head;

calculating a first vector representing the direction of the head and a second vector representing a tangent vector of a trajectory of the head during the golf swing; and calculating a vector angle between the first vector and the second vector and acquiring a time series change of the calculated vector angle.

Effect of the Invention

According to the present invention, the information of the head speed and the face direction until the impact, in a golf swing by a golfer can be acquired.

DESCRIPTION OF A PREFERRED EMBODIMENT

The system and method for measurement and analysis of a golf swing according to one embodiment of the present invention will be set forth below with reference to drawings.

Figure 1:
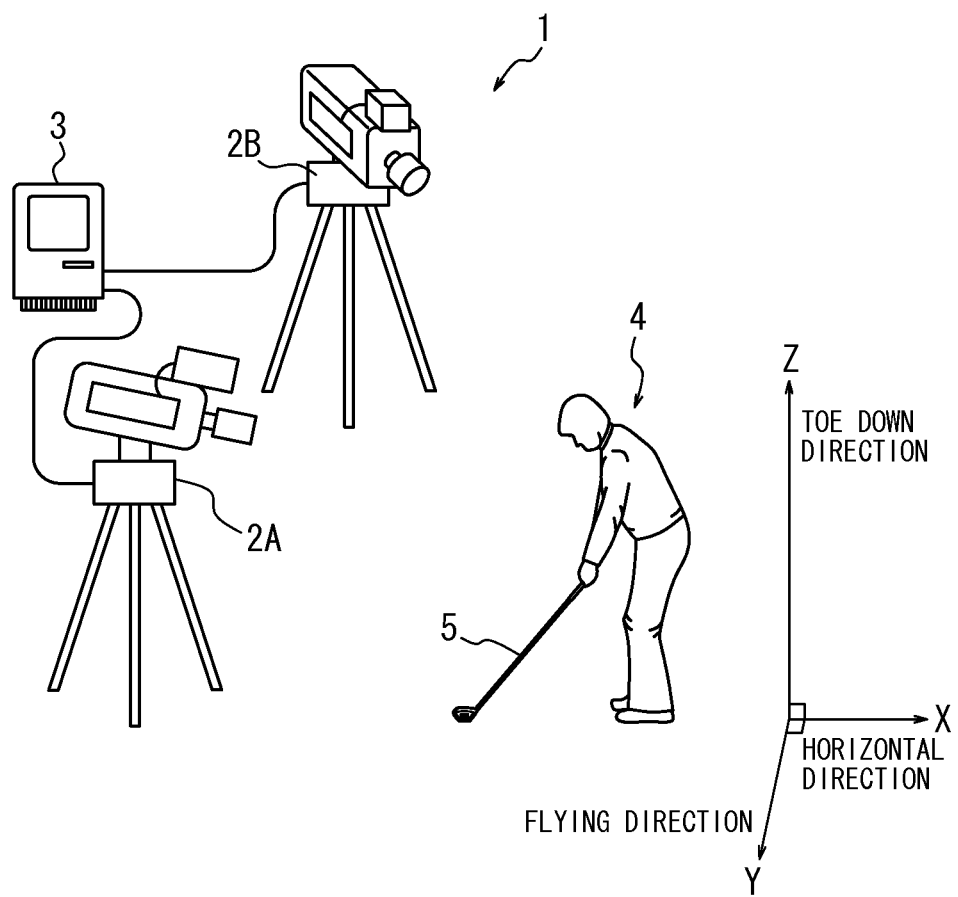
FIG. 1 is a schematic illustration illustrating a measurement and analysis system for a golf swing according to an embodiment of the present invention.

FIG. 1 is a schematic illustration illustrating a measurement and analysis system for a golf swing according to an embodiment of the present invention. The measurement and analysis system 1 shown in FIG. 1 includes the first camera 2A and the second camera 2B as imaging devices for acquiring images (movies) of a golf swing when a golfer hits a golf ball by using a golf club. Also, the measurement and analysis system 1 includes a measurement and analysis device 3 for analyzing a head behavior of a head of the golf club based on the acquired images. The measurement and analysis system 1 includes the first camera 2A and the second camera 2B as at least two cameras for acquiring three dimensional coordinate information of markers 5A and 5B attached to the golf club 5, as mentioned below by referring to FIG. 4. The analysis and measurement system 1 is portable so as to conduct measurements for golf swings by a variety of golfers at everywhere.

The first camera 2A and the second camera 2B are, for example, high speed cameras. The distance between the first camera 2A and the second camera 2B is, for example, 1100 mm.

The first camera 2A and the second camera 2B image a golf swing conducted by an examinee (a golfer) 4 by using the golf club 5. The golf club 5 has markers 5A and 5B on its head, as mentioned below by referring to FIG. 3. The first camera 2A and the second camera 2B are spaced apart each other by a predetermined distance so as to acquire images (movies) used for three dimensional measurement of a golf swing trajectory. Preferably, the distance between the first camera 2A and the second camera 2B are fixed so as to facilitate the three dimensional measurement for the golf swing trajectory even if the distance between these cameras and the examinee 4 is varied.

Also, the first camera 2A and the second camera 2B are placed above the examinee 4 and spaced apart arbitrarily from the examinee 4 so as to image the head of the golf club 5 during the golf swing by the examinee 4. As mentioned above, preferably, the space between the first camera 2A and the second camera 2B is fixed. Thus, it is possible to compare the measured swing trajectories in an identical plane even if the distance of the camera 2A and the second camera 2B from the examinee 4 is adjusted arbitrarily according to the height and the physical size of the examinee. A parallax between the first camera 2A and the second camera 2B is constant, since the distance therebetween is fixed. Accordingly, a camera coordinate system can easily be converted into the world coordinate system.

In FIG. 1, the center of the golf ball ("golf ball position" in the followings) to be hit by the examinee 4 is determined as an origin. The XYZ axis is shown spaced apart from the examinee 4 for clarification. An axis through the origin, that is perpendicular to the horizontal line (X axis) and along with toe down direction, is defined as the Z axis. Here, the toe down direction corresponds to a plumb direction. Moreover, an axis through the origin and perpendicular to the X axis and the Z axis, is called as the Y axis. The Y axis direction is substantially corresponding to the flying direction of the golf ball by a golf swing and accordingly, the Y axis is called as the "flying direction."

The imaging range in the horizontal direction (X axis direction) of the first camera 2A and the second camera 2B is 0.1 m in the front direction of the examinee 4 and in 0.4 m in the backward direction with respect to the origin. The imaging range in the flying direction (Y axis) of the first camera 2A and the second camera 2B is between −1.0 m and +0.2 m with respect to the origin. Here, the distance from the origin before the impact is shown with "−" and the distance after the impact is shown with "+."

Figure 2:
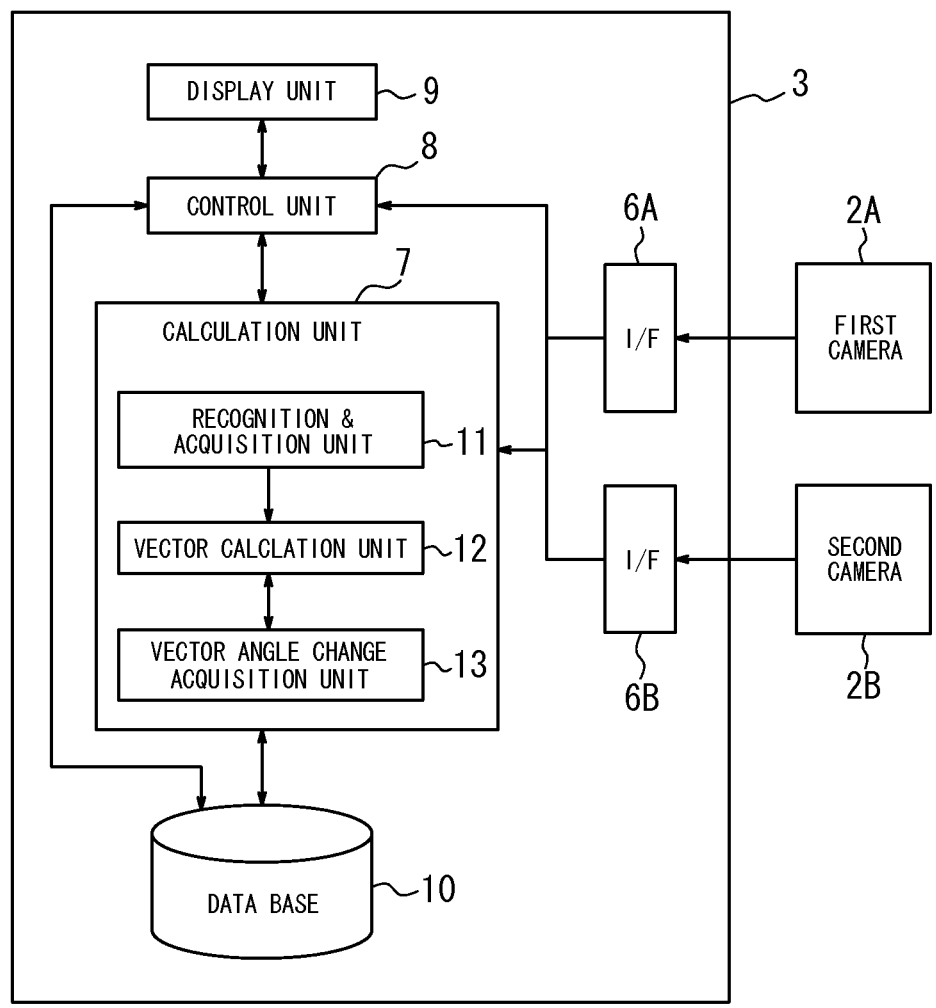
FIG. 2 is a functional block diagram illustrating schematic structure of the measurement and analysis device in the system of FIG. 1.

FIG. 2 is a functional block diagram illustrating schematic structure of the measurement and analysis device 3. The measurement and analysis device 3 has a calculation unit 7 acquires golf swing images from the first camera 2A and the second camera 2B via the interfaces (I/F) 6A and 6B and executes calculation and a control unit 8 for overall controlling of the measurement and analysis device 3. Also, the measurement and analysis device 3 has a display device 9 for displaying calculation results and so on and a marker recognition and positional information acquisition unit 11, a vector calculation unit 12, and a vector angle change acquisition unit 13.

The marker recognition and positional information acquisition unit 11 is configured for recognizing markers 5A and 5B attached to the golf club 5 for each of a predetermined number of frames extracted from the movie data acquired from the first camera 2A and the second camera 2B and acquiring three dimensional coordinate information by means of triangulation method, for example, for each positional coordinate of the markers 5A and 5B. As mentioned above, the space between the first camera 2A and the second camera 2B is fixed so as to facilitate conversion from camera coordinate to the world coordinate even if the distance between these cameras and the examinee 4 is varied due to displacement of the measurement and analysis system 1.

The vector calculation unit 12 calculates a first vector representing a direction of the head of the golf club 5 and a second vector representing a tangent vector of a trajectory of the head of the golf club 5 during the golf swing respectively, based on the respective three dimensional coordinate of the markers 5A and 5B acquired by the marker recognition and positional information acquisition unit 11. For example, the vector calculation unit 12 acquires respective trajectory for each of markers 5A and 5B during the golf swing and calculates respective tangent vector of each trajectory at each time. The trajectory of marker 5A or 5B corresponds to the head trajectory of the head of the golf club 5.

The vector angle change acquisition unit 13 calculates the vector angle between the first vector and the second vector calculated by the vector calculation unit 12 and acquires a time series change of the calculated vector angle.

Figure 3:
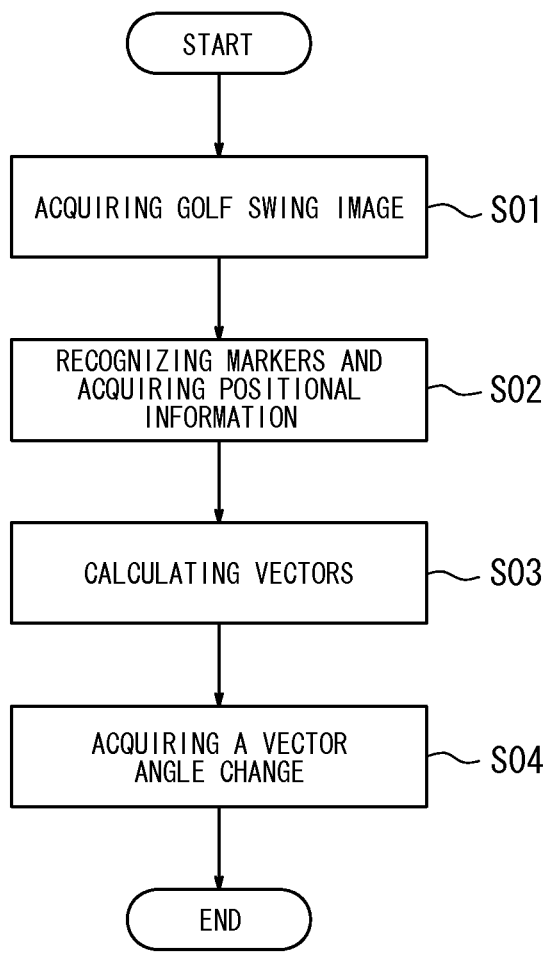
FIG. 3 is a flow chart for describing an example of the measurement and analysis method according to an embodiment of the present invention.

FIG. 3 is a flow chart for describing an example of the measurement and analysis method according to the present embodiment. The control unit 8 of FIG. 2 functions for storing images acquired from the first camera 2A and the second camera 2B via the interface (I/F) 6A and 6B to a memory (not shown) and so on (Step S01).

Then, the control unit 8 controls the marker recognition and positional information acquisition unit 11 to recognize markers 5A and 5B and to acquire the three dimensional center coordinates of markers 5A and 5B (step S02). The control unit 8 functions for extracting each image (frame) included in the movie stored in the memory (not shown) in the step S01 and recognizing the markers 5A and 5B for each extracted image and repeating calculation for the three dimensional coordinate of their center points.

Moreover, the control unit 8 controls the vector calculation unit 12 of the control unit 7 to calculate the first vector and the second vector based on the respective three dimensional coordinate of the markers 5A and 5B acquired by the marker recognition and positional information acquisition unit 11 in the step S02 (step S03). The calculation process for the first and second vectors based on the markers 5A and 5B is described below in detail with referring to FIGS. 4 and 5. Moreover, the control unit 8 controls the vector angle change acquisition unit 13 to acquire time series change of vector angle between the first vector and the second vector (step S04). Then, the control unit 8 stores the calculated time series change of vector angle to the database 10.

Figure 4:
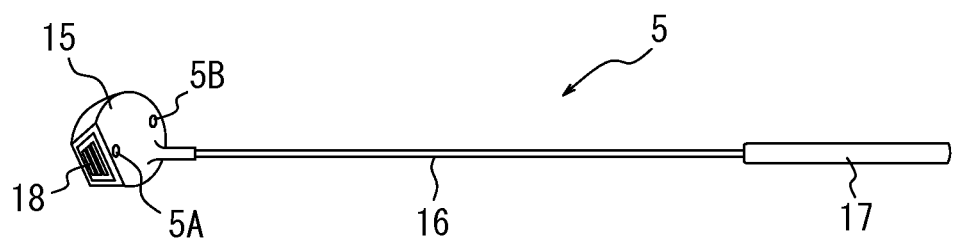
FIG. 4 is an example of the golf club having at least one marker used in the measurement and analysis system of a golf swing according to the present embodiment.

FIG. 4 is an example of the golf club having at least one marker and used in the measurement and analysis system of a golf swing according to the present embodiment. The markers 5A and 5B may be formed as a spheroidal shape, preferably formed as a spherical form. The markers 5A and 5B are attached to the golf club 5 by using, for example, a reflective tape or paint. Of course, the markers 5A and 5B can also be formed by other materials that exhibit a contrast higher than a predetermined threshold against their surrounding pixels within the image taken by the first camera 2A and the second camera 2B.

As shown in FIG. 4, the markers 5A and 5B are attached to the head 15 of the golf club 5. The markers 5A is positioned on the top of the upper surface of the head 15 and directly on a horizontal center line of the face 18. The marker 5B is positioned so as to align the line connecting the markers 5A and 5B on an imaginary plane including the horizontal center line of the face 18 and perpendicular to the face 18. In other words, the line between the markers 5A and 5B is perpendicular to the face 18 and accordingly, its tilt represents a tilt of face 18. As just illustrated in FIG. 4, the two markers 5A and 5B are attached to the golf club 5. However, the number of markers is not limited to two, and its allocation is not limited to the allocation as illustrated, as long as the markers are arranged in a pattern that can be used for detecting the tilt of face 18.

Figure 5:
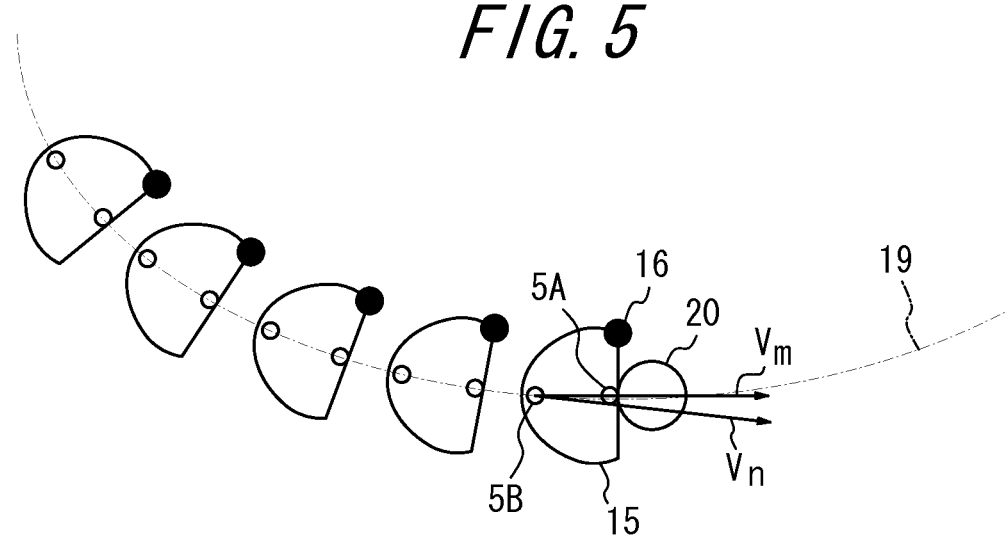
FIG. 5 is a diagram showing a trajectory of the golf club head of the golf club hitting the golf ball.

FIG. 5 is a diagram showing the trajectory of the golf club head of the golf club hitting the golf ball. The head 15 hits a golf ball 20 by moving in a trajectory 19 and rotating gradually. In FIG. 5, the shaft 16 attached to the head 15 is shown as a black dot 16 for clarification. The trajectory 19 is a trajectory of a marker 5B and is calculated based on the time series positional information of the marker 5B acquired by the marker recognition and positional information acquisition unit 11 of the measurement and analysis device 3. The vector $V_m$ is a vector calculated by the vector calculation unit 12 based on the time series positional information of the markers 5A and 5B acquired by the marker recognition and positional information acquisition unit 11. In other words, the vector $V_m$ is the first vector showing the direction of the head of the golf club 5. On the other hand, the vector $V_n$ is the second vector showing the tangent vector of each position of the head of the golf club 5 in the trajectory 19 in each time during the golf swing. The vector angle change acquisition unit 13 calculates the vector angle between the vector $V_n$ and the vector $V_m$ and acquires the time series difference of the vector angle.

Figure 6:
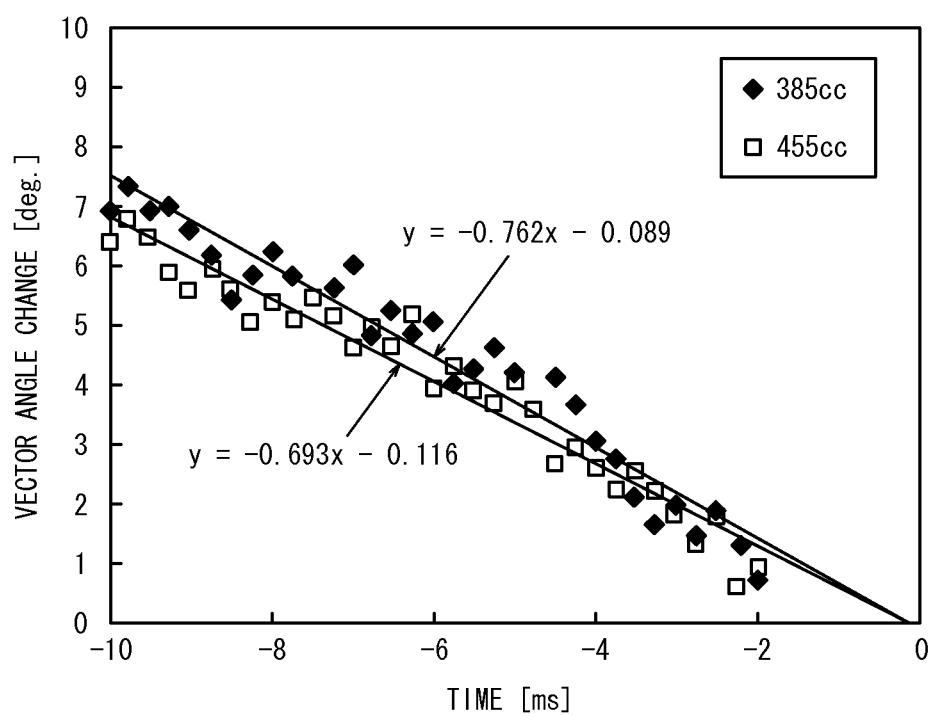
FIG. 6 is a graph showing the acquired vector angle change in the golf swing.

FIG. 6 is a graph showing the acquired vector angle change in the golf swing for heads with different mass. In FIG. 6, time zero [ms] on the horizontal axis corresponds to the impact. The vector angle change in the golf swing for each of a head with mass of 385 cc and a head with mass of 455 cc is acquired by using the measurement and analysis system 1 of FIG. 1. As shown in the graph, the head with mass of 385 cc, a head with relatively small mass, has a larger coefficient of linear approximation and accordingly has a larger angle change, because the larger head is supposed to bring about larger inertial momentum in a golf swing. In this way, the measurement and analysis system 1 of the present embodiment can acquire the information of the head angle change just before and after the impact. Therefore, the measurement and analysis system 1 of the present embodiment is capable of deriving one index to be used for assessing quantitatively a specification of a head in a golf swing.

Further, in one embodiment of the present invention, the measurement and analysis device 3 can be realized as a computer. A program for operating such computer as the device can be recorded in a memory unit attached internally or externally to the computer. Such memory unit can be realized as an external memory device, or an internal memory device such as ROM (read only memory), and RAM (random access memory). A computer functions as the above mentioned device can be realized under control of a CPU (central processing unit) and the like. That is, the CPU arbitrarily reads a program including processing contents for realizing a function of each component from the memory unit and the CPU realizes a functionality of each component on the computer. Here, the functionality of each component may be realized by a part of hardware.

The program may be distributed by selling, transferring, or leasing a removable recording medium such as a DVD (Digital Versatile Disc) or a CD-ROM, for example, on which the program is recorded. Alternatively, the program may be distributed by storing it in a memory unit of a server computer beforehand and transmitting it from the server computer to another computer via a network.

For example, the computer executing such programs may also temporarily store the program recorded in a removable recording medium or transferred from a server computer into its memory unit. Alternatively, a computer may directly read the program from a removable recording medium and execute processing according to the program, or the computer may execute processing according to the program each time the program is transmitted from a server to the computer.

According to the measurement and analysis system and the measurement and analysis method of the present embodiment, the time series change in the face direction (vector angle) with respect to the head trajectory to the impact can be acquired. Moreover, the system and method can provide information for supporting golfer's selection for an adequate shaft by estimating an amount of flip of the golfer's wrist and flipping position based on the acquired information.

One embodiment of the present invention has been described above. Various modifications can be adapted without departing from the scope of the claim. For example, the first camera 2A and the second camera 2B are used for imaging examinee 4 in the measurement and analysis system 1, in the above mentioned embodiment. However, single camera can be used for imaging the golf swing by the examinee 4 and the acquired image can be measured and analyzed by the measurement and analysis device 3.

Moreover, two markers 5A and 5B are shown in FIG. 3. However, those markers can be alternated by one marker formed as a line perpendicular to the face 18. The necessary functionality for the markers used in the present invention reside in detecting the tilt of the face 18 of the golf club, as described above.

What is claimed is:

1. A measurement and analysis system for measuring and analyzing a head behavior when a golfer hits a golf ball by a golf club, comprising:
    a golf club used by the golfer and having at least one marker on a head, the marker is formed as a line perpendicular to the face or as at least two markers;
    at least two cameras for imaging a golf swing by using the golf club; and
    a measurement and analysis device having a marker recognition and positional information acquisition unit for recognizing the at least one marker and acquiring positional information of the recognized at least one marker, a vector calculation unit for calculating a first vector representing a direction of the head and a second vector representing a tangent vector of a trajectory of the head during the golf swing, and a vector angle change acquisition unit for calculating a vector angle between the first vector and the second vector and acquiring a time series change of the calculated vector angle.

2. A measurement and analysis system according to claim 1, wherein
    the golf club has at least two markers, and
    the vector calculation unit calculates the first vector, based on the positional information of the at least two markers acquired by the marker recognition and positional information acquisition unit.

3. A measurement and analysis method for measuring and analyzing a head behavior when a golfer hits a golf ball by a golf club, conducted by a measurement and analysis device, comprising the following steps conducted by the measurement and analysis device:
    recognizing the at least one marker formed as a line perpendicular to the face or as at least two markers and acquiring positional information of the recognized at least one marker for images of a golf swing by using the golf club having at least one marker on a head;
    calculating a first vector representing the direction of the head and a second vector representing a tangent vector of a trajectory of the head during the golf swing; and
    calculating a vector angle between the first vector and the second vector and acquiring a time series change of the calculated vector angle.

* * * * *